(12) United States Patent
Hayashi

(10) Patent No.: US 12,106,164 B2
(45) Date of Patent: Oct. 1, 2024

(54) INFORMATION OBTAINING METHOD, INFORMATION PROVISION DEVICE, INFORMATION OBTAINING DEVICE, AND STORAGE MEDIUM COMPRISING OBTAINING AN IMAGE OF A DESIGN PRINTED ON A PRINTING TARGET THAT INCLUDES AN IDENTIFIER, THE IDENTIFIER CORRESPONDING TO SPECIFIC INFORMATION AND OBTAINING SPECIFIC INFORMATION CORRESPONDING TO THE IDENTIFIER

(71) Applicant: CASIO COMPUTER CO., LTD., Tokyo (JP)

(72) Inventor: Kazuko Hayashi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/125,536

(22) Filed: Mar. 23, 2023

(65) Prior Publication Data
US 2023/0306220 A1     Sep. 28, 2023

(30) Foreign Application Priority Data

Mar. 25, 2022 (JP) ................. 2022-049211

(51) Int. Cl.
*G06V 30/18* (2022.01)
*G06K 15/02* (2006.01)
(Continued)

(52) U.S. Cl.
CPC ....... *G06K 15/021* (2013.01); *G06V 30/1444* (2022.01); *G06V 30/18105* (2022.01); *G06V 30/30* (2022.01)

(58) Field of Classification Search
CPC ......... G06K 19/0776; G06K 19/07758; G06K 19/077; G06K 15/021; G06V 30/1444;
(Continued)

(56) References Cited

U.S. PATENT DOCUMENTS

| | | | | |
|---|---|---|---|---|
| 2005/0061890 A1* | 3/2005 | Hinckley | ............... | G06K 19/04 235/494 |
| 2014/0042233 A1* | 2/2014 | Yang | ................ | G06K 19/06046 235/494 |

FOREIGN PATENT DOCUMENTS

| | | |
|---|---|---|
| JP | 2001-273441 A | 10/2001 |
| JP | 2012-020035 A | 2/2012 |

(Continued)

OTHER PUBLICATIONS

JPO; Application No. 2022-049211; Notice of Reasons for Refusal dated Feb. 13, 2024.
(Continued)

*Primary Examiner* — Chad Dickerson
(74) *Attorney, Agent, or Firm* — Fitch, Even, Tabin & Flannery LLP

(57) ABSTRACT

An information obtaining method includes obtaining an image of a design printed on a printing target. The design includes an identifier corresponding to specific information. The information obtaining method further includes identifying the identifier included in the design based on the image; and obtaining the specific information corresponding to the identifier based on the identifier.

9 Claims, 12 Drawing Sheets

| FINGER NAME / NUMBER | THUMB / 1 | INDEX FINGER / 2 | MIDDLE FINGER / 3 | RING FINGER / 4 | LITTLE FINGER / 5 |
|---|---|---|---|---|---|
| DOMINANT NUMERAL RECOGNIZED IN READING ORDER | 2 | 8 | 6 | 3 | 7 |
| COLOR SCHEME (BACKGROUND/CHARACTER) RECOGNIZED IN READING ORDER | GRAY/ WHITE | YELLOW/ GRAY | WHITE/ Orange | GRAY/ YELLOW | Orange/ WHITE |

(51) Int. Cl.
*G06V 30/14* (2022.01)
*G06V 30/30* (2022.01)

(58) Field of Classification Search
CPC ............. G06V 30/30; G06V 30/18105; H04N 1/32304; H04N 2201/3269; H04N 2201/327
USPC ........................................... 358/1.6; 347/104
See application file for complete search history.

(56) References Cited

FOREIGN PATENT DOCUMENTS

| | | | |
|---|---|---|---|
| JP | 2014-525102 A | | 9/2014 |
| JP | 2016029452 A | * | 3/2016 |
| JP | 2016126792 A | * | 7/2016 |
| JP | 2020-010882 A | | 1/2020 |

OTHER PUBLICATIONS

JPO; Application No. 2022-049211; Notice of Reasons for Refusal dated Jul. 30, 2024.

* cited by examiner

FIG. 5
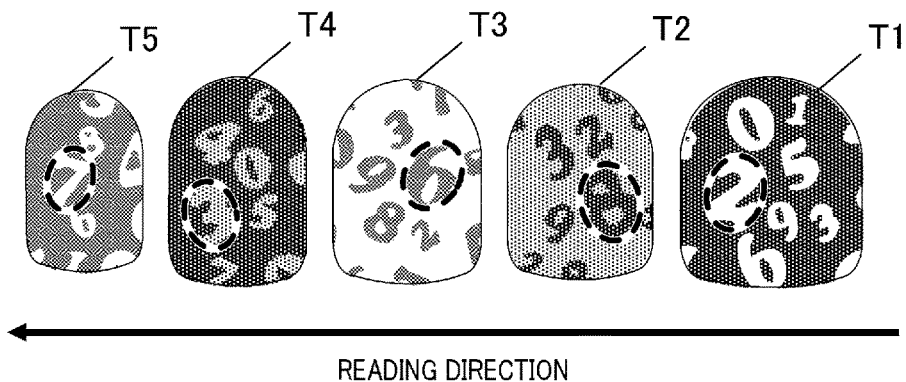
READING DIRECTION
FIG. 6
| FINGER NAME / NUMBER | THUMB / 1 | INDEX FINGER / 2 | MIDDLE FINGER / 3 | RING FINGER / 4 | LITTLE FINGER / 5 |
|---|---|---|---|---|---|
| DOMINANT NUMERAL RECOGNIZED IN READING ORDER | 2 | 8 | 6 | 3 | 7 |
| COLOR SCHEME (BACKGROUND/CHARACTER) RECOGNIZED IN READING ORDER | GRAY/ WHITE | YELLOW/ GRAY | WHITE/ Orange | GRAY/ YELLOW | Orange/ WHITE |
FIG. 7
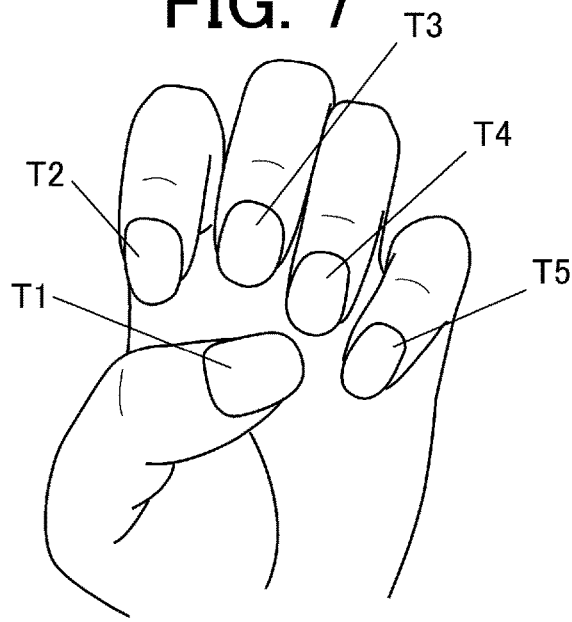

READING DIRECTION

| ID<br>(NUMBER SEQUENCE) | CORRESPONDING URL |
|---|---|
| 28637 | https://www.***.com/**.jp/ |
| 45902 | https://web.***.com/**_news |
| 84335 | http://www.△△△.com/****.jp/ |
| ... | .. |

| FINGER NUMBER | ID<br>(COLOR SCHEME (BACKGROUND COLOR)) | CORRESPONDING URL |
|---|---|---|
| 1→2→3→4→5 | GRAY→YELLOW→WHITE→GRAY→Orange | http://www.***.com/**.jp/ |
| 5→4→3→2→1 | Orange→GRAY→WHITE→YELLOW→GRAY | http://***.com/**_news |

FIG. 15

| MOTIF (SHAPE) | CORRESPONDING NUMBER |
|---|---|
| — | 0 |
| = | 1 |
| ↘ | 2 |
| ↙ | 3 |
| \| | 4 |
| + | 5 |
| ∧ | 6 |
| \|\| | 7 |
| ⌐ | 8 |
| ⌙ | 9 |

FIG. 16

| AREA ORDER | CORRESPONDING NUMBER |
|---|---|
| AREA A | 9 |
| AREA B | 2 |
| AREA C | 3 |
| AREA D | 8 |

FIG. 18

| ID (NUMBER SEQUENCE) | CORRESPONDING URL |
|---|---|
| 9238 | https://www.***.com/**jp/ |
| 9382 | https://web.***.com/**_news |
| 9832 | http://www.△△△.com/****jp/ |
| 9283 | https://www.○○○.com/****jp/ |
| 9328 | https://web.△△△.com/****_news |
| 9823 | http://www.▼▼▼.com/****jp/ |
| 2・・・ | ・・・ |

FIG. 19

| ID (NUMBER SEQUENCE) | READING TIME | CORRESPONDING CODE |
|---|---|---|
| 9238 | 0:00-05:59 | 58akdo378 |
| 9238 | 06:00-11:59 | 98knfub88 |
| 9238 | 12:00-17:59 | 26kjnsa10 |

| MOTIF (SHAPE) | CORRESPONDING NUMERICAL VALUE |
|---|---|
| ● | 1 |
| ! | 2 |
| ✺ | 3 |
| ٭ | 4 |
| ▲ | 5 |
| ▼ | 6 |

| READING AREA | MOTIF (SHAPE IN AREA) | ID (TOTAL OF NUMERICAL VALUE) | CORRESPONDING URL |
|---|---|---|---|
| a | ● | 1 | https://www.***.com/**.jp/ |
| b | ! ✺ ! | 7 | https://web.***.com/**_news |
| c | ! ! ! | 8 | http://www.△△△.com/****.jp/ |
| d | NONE | 0 | https://www.○○○.com/****.jp/ |
| e | ٭ ▼ | 10 | https://web.△△△.com/****_news |

INFORMATION OBTAINING METHOD, INFORMATION PROVISION DEVICE, INFORMATION OBTAINING DEVICE, AND STORAGE MEDIUM COMPRISING OBTAINING AN IMAGE OF A DESIGN PRINTED ON A PRINTING TARGET THAT INCLUDES AN IDENTIFIER, THE IDENTIFIER CORRESPONDING TO SPECIFIC INFORMATION AND OBTAINING SPECIFIC INFORMATION CORRESPONDING TO THE IDENTIFIER

REFERENCE TO RELATED APPLICATIONS

This application is based upon and claims the benefit of priority from the prior Japanese Patent Application No. 2022-049211, filed on Mar. 25, 2022, the entire contents of which are incorporated herein by reference.

TECHNICAL FIELD

The present disclosure relates to an information obtaining method, an information provision device, an information obtaining device, and a storage medium.

DESCRIPTION OF RELATED ART

In conventional nail printing, various designs are printed on nails, nail tips, nail stickers, and the like using a printing device.

Designs to be printed on nails, nail tips, and the like are not limited to those consisting of pictures and the like. For example, in JP 2016-029452 A, there is disclosed preparation of a nail sticker on which a two-dimensional code including encoded personal information such as contact information and application of the nail sticker to a nail of a person in need of protection who is likely to wander about. This allows registered contact information to be obtained easily by reading the two-dimensional code and the like printed on the nail sticker when the person in need of protection is protected as an unidentified person while wandering about, etc., and enables the registered contact person to be contacted.

SUMMARY OF THE INVENTION

An information obtaining method of the present disclosure is executed by an information provision device, and the information obtaining method includes:
  obtaining an image of a design printed on a printing target, the design including an identifier corresponding to specific information;
  identifying the identifier included in the design based on the image; and
  obtaining the specific information corresponding to the identifier based on the identifier.

BRIEF DESCRIPTION OF DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein:

FIG. 5 is a diagram illustrating an example of a printing result on nails of five fingers;

FIG. 6 is a table showing an example of information that has been read from the printing result illustrated in FIG. 5;

FIG. 7 is a diagram illustrating a variation of an arrangement of nails;

FIG. 15 is an example of correspondence data illustrating numbers corresponding to respective shapes when motifs are the shapes;

FIG. 16 is an example of correspondence data when numbers are associated with respective areas;

FIG. 18 is an example of data configuration schematically showing specific information associated with respective identifiers when the identifiers are sequences of the numbers associated with the areas;

FIG. 19 is an example of data configuration illustrating change in specific information associated with an identifier depending on time when the identifier is a sequence of the numbers associated with the areas;

DETAILED DESCRIPTION

Hereinafter, one or more embodiments of the information obtaining method, the information provision device, the information obtaining device, and the storage medium according to the present disclosure will be described with reference to the drawings.

Although various limitations technically preferable for carrying out the present disclosure are put on the embodiment(s) described below, the technical scope of the present disclosure is not limited to the embodiment(s) below or illustrated examples.

[Configuration of Information Provision System]

The information obtaining method of the present embodiment functions in an information provision system configured with a device on an information provider side and a device on an information receiver side. In the information provision system, both the information provider and receiver may be companies, stores, or individual users.

In the following, each of the devices will be described.

[Configuration of Information Provider]

Figure 1:
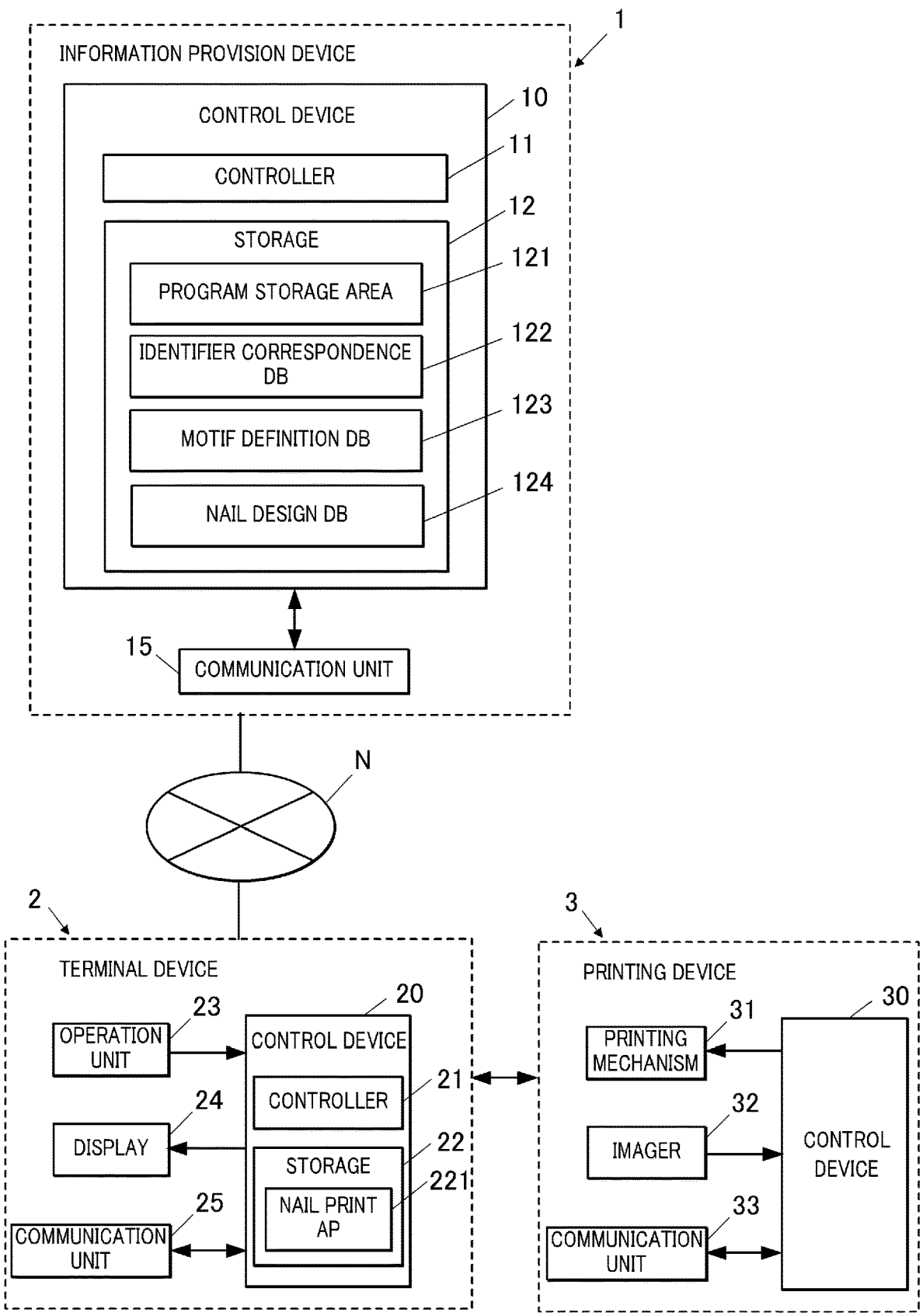
FIG. 1 is a diagram illustrating a controlling configuration of an information provision device, a terminal device, and a printing device that constitute an information obtaining system of an embodiment.

FIG. 1 is a diagram illustrating an example of the configuration of devices that constitute the information provider of an information provision system and the controlling configuration of the information provision device, a terminal device, and a printing device.

In the example illustrated in FIG. 1, the information provider includes an information provision device 1 and a terminal device that can communicate with the information provision device 1 via a network N. In the present embodiment, the terminal device 2 is connected to a printing device 3 wirelessly or by wire, and can send and receive information to and from the printing device 3. FIG. 1 illustrates the case where there are one terminal device 2 and one printing device 3, but the number of the terminal device 2 connected to the information provision device 1 via the network N and the number of the printing device 3 connected to the terminal device 2 are not particularly limited.

The information provision device 1 is a data provision server, for example, of a company, etc., and provides various types of information, services, etc., to those who wish to receive them.

As illustrated in FIG. 1, the information provision device 1 includes a control device 10, a communication unit 15, and the like.

The control device 10 is a computer including a controller 11 having at least one processor such as a CPU (Central Processing Unit) and a storage 12 having at least one memory such as a ROM (Read Only Memory) and a RAM (Random Access Memory).

The controller 11 performs overall control of the components of the information provision device 1. The controller 11 performs various functions by working together with programs stored in the storage 12 and operates the information provision device 1.

The storage 12 includes, to store various programs, various data and so forth that cause the components of the information provision device 1 to operate, a program storage area 121, an identifier correspondence database 122 (an identifier correspondence DB in the drawings and the following description), a motif definition database 123 (a motif definition DB in the drawings and the following description), a nail design database 124 (a nail design DB in the drawings and the following description), and the like.

The identifier correspondence DB 122 (first memory) stores first correspondence data that define the correspondence between the "specific information" and the "identifier" in advance.

The "specific information" includes, for example, text information such as URL (Uniform Resource Locator) information of companies and various store websites, account information of various SNS (Social networking services), e-mail addresses, telephone numbers, card numbers, security codes, unique IDs such as various membership numbers to identify individuals, and so forth. For example, the "specific information" may be the address information required to access a company's or store's member registration page or product description page. Furthermore, the "specific information" may include, for example, a ticket number to attend a particular event (for example, a concert or a sporting event).

The "identifier" in the present embodiment can correspond to the "specific information" and is a random number sequence, a letter sequence, a shape, a symbol, and a combination of these. In the present embodiment, the "identifier" itself is not printed as a part of the design, but a "motif" for identifying the "identifier" is printed as a part of the design. Therefore, the "identifier" itself can be a mere character sequence (for example, the number sequence "28637" illustrated in FIG. 9) that is not highly designed. In the drawings, an "identifier" is referred to as an "ID". In the following description, an "identifier" is also referred to as an "ID".

In the present embodiment, the "identifier" is included as a component of the design in the image (printing result) to be printed by the printing device 3 detailed below. The "identifier" is identified, for example, by a motif or a combination of motifs that is a component of the design. The "identifier" may be a combination of any letters, shapes, etc., and may consist of any number of letters depending on the setting. When the "identifier" is composed of multiple complex letter sequences and the like, the security of the information will be improved.

The identifier correspondence DB 122 stores a combination of an "identifier" consisting of a letter sequence, number sequence, and the like, and "specific information" (for example, various types of address information) corresponding to the "identifier".

The motif definition DB 123 (second memory) stores the second correspondence data that define a rule(s) (a condition(s)) in advance for identifying the "identifier" from the "motif" that is a component of the design when "identifier" is used as an element of the design as a "motif".

The "motif" is, for example, a letter(s) such as an alphabet(s), a numeral(s), a symbol(s), a shape(s), a color scheme, and the like. The "motif" in the present embodiment constitutes a design and includes deformed letters, numerals, or the like so as to have a design characteristics by itself unlike the "identifier". Preferably, the "motif" is readable from the printed image as letters, numerals, and the like, and is comfortable as a nail design such as the numerals in the designs illustrated in FIG. 5 and FIG. 8. The letters and numerals used as the "motif". The letters and numerals used as the "motif" do not have to be particularly deformed as long as they match the surrounding design and can be identified as the "motif" in the image. For example, a letter of a different color or orientation may be mixed in as a "motif" in a design with an all-over pattern of alphabets.

The "identifier" may be identified from a "motif" included in a design drawn on one nail, or from "motifs" that are included separately in designs drawn on respective nails.

The motif definition DB 123 stores rules on what kind of letters, numerals, shapes, color schemes, etc. are treated as the "motif" for identifying the "identifier", rules (conditions) on how to identify the "identifier" according to the type, arrangement, and order of the letters, numerals, shapes, color schemes, and the like that are the "motifs", and the like.

In other words, not all the numerals and alphabets in the design are treated as "motifs" used to identify the "identifier". Also, even when the same letter or the same shape is selected as a "motif" that constitutes the design, the "identifier" to be identified differs depending on the arrangement of each "motif" (such as a numeral), etc.

For example, when multiple letters, symbols, etc. are randomly arranged in the design printed on the nail as the printing target (medium), a rule may be set such that the most dominant one, printed occupying the largest area with respect to the nail area, is recognized as the "motif" for identifying the "identifier". Alternatively, a rule may be set such that, for example, of the multiple letters, symbols, etc., only one(s) printed in a specific color is recognized as the "motif" for identifying the "identifier". Further alternatively, a rule may be set such that, for example, of the multiple letters, symbols, etc., one(s) printed in a specific position (for example, in the center or at the tip) of a nail is recognized as the "motif" for identifying the "identifier".

As a further example, when designs are printed on respective nails of five fingers from thumb to little finger of one hand, a rule may be set based on an arrangement (reading order) of the recognized "motifs" such that the "motifs" such as letters recognized from respective nails are arranged in order from the thumb to the little finger to identify the "identifier", or in order from the little finger to the thumb to identify the "identifier". Further, a rule may be set such that a different "identifier" is identified even when the combination of the "motifs" printed on respective nails is the same, depending on the order of the "motifs" from which finger.

The nail design DB 124 stores multiple sets of design data including information on nail designs. The design including the "motif" is based on the basic design data. The information stored in the nail design DB 124 may be individual nail designs or a set of designs (for example, a set for five nails of the thumb and four fingers of one hand).

The controller 11 converts the "specific information" to the "identifier" corresponding to the "specific information" based on the correspondence information (first correspondence data) of the "specific information" and the "identifier" stored in the "identifier correspondence DB 122".

For example, when a person who has information to be included in a design to be printed on a nail sends the information to the information provision device 1 as "specific information," the controller 11 converts it into an "identifier" and corresponds the two together. When new "specific information" (for example, a new user's personal e-mail address) is sent to the information provision device 1, the method for converting it into an "identifier" consisting of letters, shapes, etc., is not limited in particular. When new "specific information" is converted to an "identifier", the correspondence information between the "specific information" and the converted "identifier" is stored in the identifier correspondence DB 122.

Also, based on the definition information (second correspondence data) regarding the rule for identifying the "identifier" from the "motif" stored in the motif definition DB 123, the controller 11 sets the "motif" to be a component of the design (the "motif" that is comfortable when included in the design) as corresponding to the "identifier".

For example, when certain "specific information" is converted into "identifier" which is a number sequence of "12345", based on the rule that the "motifs" such as letters recognized from respective nails are arranged in order from the thumb to the little finger to identify the "identifier" and the rule that the most dominant numerals or the like among multiple printed numerals and the like that occupies the largest area is recognized as the "motif" for identifying the "identifier", the controller 11 sets the "motif" such that the thumb nail to the little finger nail respectively contain numerals "1" to "5" in that order, and the numerals are printed largest in the respective nails.

The controller 11 generates data of designs including the "motif" set according to the rule(s).

The data of the basic design (for example, a floral design, alphabetical design, numeric design, and the like) that are to include the "motif" are stored in the above-mentioned nail design DB 124, etc. The data of the basic design that are to include the "motif" may be designated by the user who provides the information (for example, the user who has requested the embedding of the "specific information"). Alternatively, the data of the basic design that are to include the "motif" may be configured to be selected by the user, etc. who performs printing on the nail using the printing device 3. In these cases, for example, the controller 11 selects and sets a "motif" that is comfortably incorporated into the design desired by the user, and the like. For example, when the user, etc. desires an alphabetic pattern, the "motif" for identifying the "identifier" is also constituted by an alphabet.

The communication unit 15 performs wired or wireless data communication through a network N and the like and meets the communication standard of an external device such as the terminal device 2 and the printing device 3. The communication method of the communication unit 15 is not particularly limited as long as data communication with the external device is available.

The terminal device 2 functions as a user interface for operation of the printing device 3 and is, for example, a portable terminal such as a smartphone, a tablet, a cell phone, a personal computer, and the like. The terminal device 2 is not particularly limited as long as it can communicate with the printing device 3, information provision device 1, and the like, and may be, for example, a notebook or stationary personal computer, a terminal device for games, and the like.

When a user performs printing on nails using the printing device 3 placed in a store such as a nail salon, the terminal device 2 is, for example, a smartphone of the user. When the terminal device 2 receives the data of the design including the "identifier" (more specifically, the "motif" for identifying the "identifier") from the information provision device 1, the controller 21 described below adjusts the data of the design to a print area (nail area) of the nail as the printing target, generates print data, and transmits the print data to the printing device 3. In this way, a design that includes the "identifier" corresponding to the "specific information" as a "motif" can be printed on the nail.

On the other hand, when a user uses the printing device 3 at home, the terminal device 2 may be an operation terminal that operates the printing device 3, and may be configured integrally with the printing device 3.

As shown in FIG. 1, the terminal device 2 includes an operation unit 23, a display 24, a communication unit 25, a control device 20, and the like.

The operation unit 23 is capable of performing various inputs, settings, and the like in response to user operations. Input signals corresponding to the operations received by the operation unit 23 are transmitted to the control device 20. A touch panel as the operation unit 23 is integrally provided on the surface of the display 24. The user performs touching operation on the touch panel to perform various operations such as input and setting. The operation unit 23 is not limited to the touch panel, but can also be, for example, various operation buttons, a keyboard, a pointing device, and the like.

The display 24 includes a liquid crystal display (LCD), an organic electroluminescent display (OELD), other flat display, or the like, and displays various types of information in response to display commands from the controller 21.

For example, the display 24 may display an image indicating the result of printing on the user's nail based on the data of the design generated by the information provision device 1.

The communication unit 25 performs wired or wireless data communication through a network N and the like and meets the communication standard of an external device such as the information provision device 1 and the printing device 3. The communication method of the communication unit 25 is not particularly limited as long as data communication with the external device is available.

In the present embodiment, data of a design including the "identifier" as a component of the design as the "motif" are generated by the information provision device 1 and sent to the terminal device 2 via the communication unit 25. Upon receiving the data of the design, the terminal device 2 generates print data based on the data of the design and sends the print data to the printing device 3 via the communication unit 25.

The control device 20 is a computer having a controller 21 with a processor such as a CPU, and a storage 22 with a ROM, a RAM, and other components.

The controller 21 performs overall control of the components of the terminal device 2. The controller 21 performs various functions by working together with programs stored in the storage 22 and operates the terminal device 2.

The storage 22 stores various programs, various data and so forth that cause the components of the terminal device 2 to operate. More specifically, the storage 22 stores various programs, such as an operating program for performing overall control of the components of the terminal device 2 and a nail printing application program (a "nail print AP" in FIG. 1) 221 for performing nail printing with the printing device 3. The controller 21 loads these programs to a working area of the storage 22 and executes the same, thereby controlling the terminal device 2.

When a user wishes to include text information such as an account of his/her own SNS (Social networking service), e-mail address, and so forth as "specific information" in a design to be printed on a nail, the controller 21 of the terminal device 2 requests the information provision device 1 to generate data of a design including this text information via a dedicated application, for example. When data of a design including an "identifier" ("motif" for identifying the "identifier") corresponding to the "specific information" are generated, the terminal device 2 receives the data from the information provision device 1. When data of a design including information on a ticket purchased by the user (ticket number, seat number, etc.) as the "specific information" is provided instead of the ticket, the terminal device 2 receives the data from the information provision device 1.

In the present embodiment, the printing device 3 sends a nail image to the terminal device 2. The nail image is generated by imaging the nail that is the printing target arranged on a finger placement unit. The controller 21 performs various imaging processes such as image analysis on this nail image, extract the nail area (the area inside the nail contour that separates the nail from the finger skin) in the captured image, and generates nail information including the shape of the nail area.

When the data of the design including the "motif" set to correspond to the "identifier" is sent from the information provision device 1, the controller 21 generates print data based on the data of the design sent from the information provision device 1 and the nail information (nail contour, nail area, etc.). Specifically, the controller 21 expands or contracts the data of the design as appropriate to adjust it to the nail area, and generates print data that matches the shape of the user's nail. The generated print data is sent to the printing device 3 that is used for printing on the nail by the user.

The printing device 3 can be suitably placed in nail salons, beauty salons, or other stores, but may also be used at the user's home or other places.

In the present embodiment, there is described an example in which the printing target of the printing device 3 is a fingernail of a hand. However, the printing target is not limited to a fingernail of a hand, but may be a toenail. The printing target may not be a nail but a surface of a nail chip, various accessories, or the like.

As shown in FIG. 1, the printing device 3 includes a printing mechanism 31 that performs printing operations, an imager 32, a communication unit 33, a control device 30, and the like. The printing device 3 may further include an operation unit, a display, and so on. When the terminal device 2 functions as a user interface of the printing device 3, the operation unit 23 and display 24 of the terminal device 2 may also function as the operation unit and display of the printing device 3.

The printing mechanism 31 performs printing on the nail, which is the printing target, arranged on the finger placement unit (not shown in the drawing) in the printing device 3. Although not shown in the drawing, the printing mechanism 31 includes a print head that performs the printing operation and a moving mechanism that moves the print head.

The print head prints a design (nail design) on a nail or the like, and is capable of ejecting inks of various colors, such as cyan (C), magenta (M), yellow (Y), and the like. The printing head is not particularly limited, but is an inkjet head that can spray fine droplets of the ink (fluid) from the ink ejecting surface onto the nail surface to perform fine printing. The print head is not particularly limited in type or number. For example, another printing head that performs printing with an underlying liquid may be used in combination.

The moving mechanism, when it is driven, moves the print head against a nail surface of a finger arranged in the finger placement unit.

The imager 32 is arranged inside the printing device 3, at a position above the finger placement unit. The imager 32 includes a camera and a light source, not shown in the drawing, images a surface of a nail (a finger including a nail), and obtains a nail image (an image of a finger including a nail) thereof. In the present embodiment, the nail image and the like generated by the camera of the imager 32 is sent to the external device such as the terminal unit 2 via the communication unit 33 and the like.

The control device 30 includes a controller with a processor such as a CPU, and a storage with a ROM, a RAM, and other components (none of which are shown in the drawing).

The storage stores various programs, various data and so forth that cause the printing device 3 to operate. More specifically, the ROM of the storage stores various programs, such as a printing program for performing a printing process.

The controller loads the programs stored in the ROM of the storage to a working area of the RAM and executes the same, thereby performing overall control of the components of the printing device 3. In other words, the controller performs various functions by working together with the programs such that the printing device 3 performs the printing process and the like.

In the present embodiment, the controller controls the operation of the printing mechanism 31 and causes the printing device 3 to perform printing operations based on the print data. The controller also causes each part of the imager 32 to operate and obtain a nail image, and sends the nail image to the terminal device 2, etc. via the communication unit.

In this way, the printing device 3 performs nail printing on a nail, etc. based on print data of a design including "specific information" converted into a corresponding "identifier" as a "motif" that constitutes the design.

[Configuration of Information Obtainer]

Figure 2:
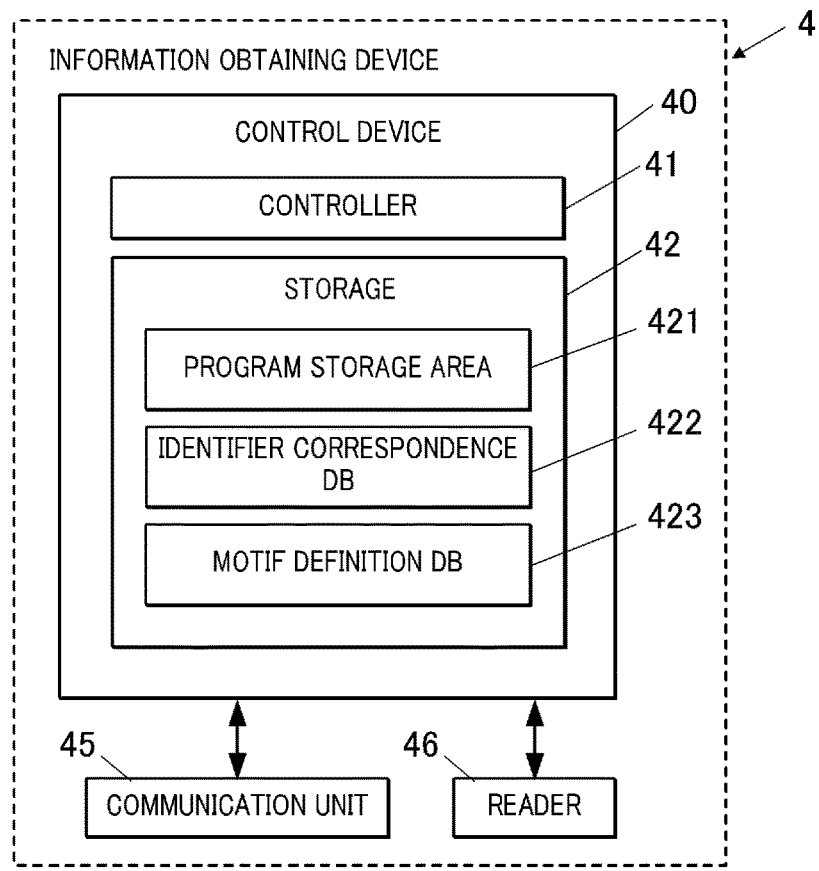
FIG. 2 is a diagram illustrating a controlling configuration of an information obtaining device that constitute the information obtaining system of the embodiment.

FIG. 2 illustrates a control configuration of the information obtaining device, which is the information obtainer (receiver side) of the information providing system.

The information obtaining device 4 obtains an image of a printing result that has been printed on a nail as a print target (medium), extracts (identifies) an "identifier" from the obtained image, converts it into "specific information" corresponding to the extracted "identifier", and obtains the "specific information".

As illustrated in FIG. 2, the information obtaining device 4 includes a control device 40, a communication unit 45, a reader 46, and the like.

In the example illustrated in FIG. 2, the information obtaining device 4 is a device (a reader-only device that reads the printing result on a nail) that is expected to be placed, for example, at an entrance gate of a store or an event venue. However, the information obtaining device is not limited to such a dedicated device (dedicated reading device).

For example, a terminal device such as a smartphone of a user may function as the information obtaining device. In this case, the camera portion of the terminal device functions as the reader. Also in this case, a dedicated application and the like is stored in the storage of the terminal device to identify the "identifier" from the printing result of the design printed on the nail and to obtain the "specific information" corresponding to the "identifier".

The communication method of the communication unit 45 is not particularly limited as long as data communication with the external device such as the information provision device 1 is available. The communication unit 45 meets the communication standard of the external device such as the information provision device 1.

The reader 46 obtains an image of a printing result that has been printed on a nail as a print target (medium) based on the data of the design including an "identifier" that is associated with "specific information" in advance. Specifically, the reader 46 has a camera and the like, not shown in the drawing, and obtains an image of a nail held over the reading screen 461 (see FIG. 3) while scanning the nail in a predetermined reading direction (the reading direction indicated by the arrow in FIG. 5).

The image obtained by the camera of the reader 46 is sent to the controller 41 of the control device 40.

Figure 3:
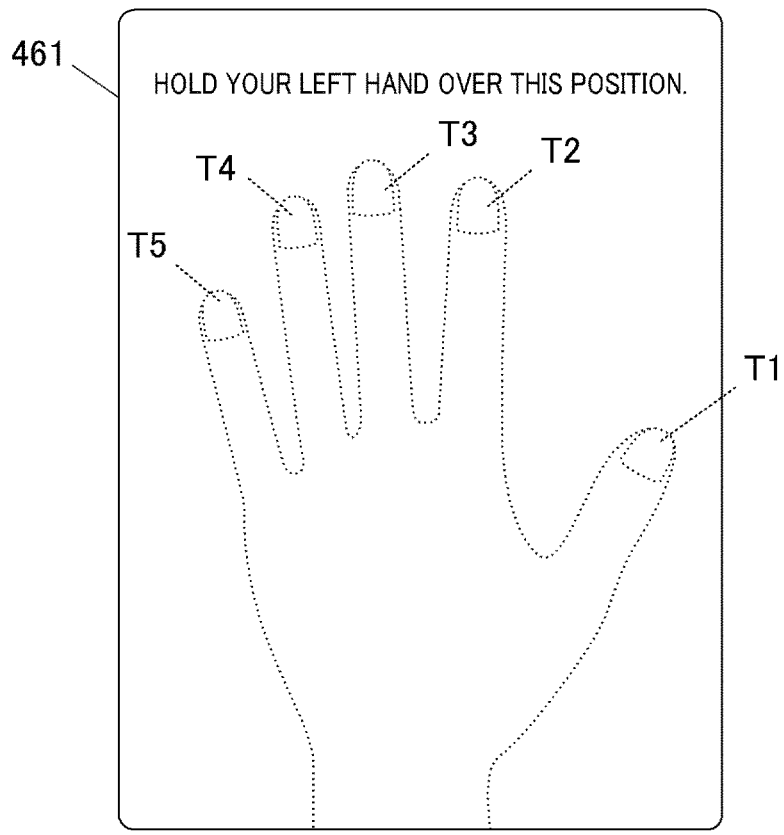
FIG. 3 is a diagram illustrating an example of a reading screen of a reader of the information obtaining device.

FIG. 3 is a diagram illustrating an example of an image of the reading screen 461 of the reader 46 of the information obtaining device 4.

In order that the reader 46 obtains an image of the design printed on the nail (printing result), the user is requested to hold the hand (left hand in the diagram) up to present the nail on which printing is done to the camera or the like. For example, the reader 46 has the reading screen 461 (see FIG. 3, for example) that instructs the user on the position of the hand, etc. The reading screen 461 indicates the position, orientation, etc. of the hand or nail by means of an image or text. Instructions to the user are not limited to be given with an image or text. For example, instructions on the orientation of the nail, etc., may be given via voice guidance, etc.

The control device 40 of the information obtaining device 4 is a computer having a controller 41 with a processor such as a CPU, and a storage 42 with a ROM, a RAM, and other components.

The controller 41 performs overall control of the components of the information obtaining device 4. The controller 41 performs various functions by working together with programs stored in the storage 42 and operates the information obtaining device 4.

The storage 42 includes, to store various programs, various data and so forth that cause the components of the information obtaining device 4 to operate, a program storage area 421, an identifier correspondence database 422 (an identifier correspondence DB in the drawings and the following description), a motif definition database 423 (a motif definition DB in the drawings and the following description), and the like.

The identifier correspondence DB 422 includes, similar to the identifier correspondence DB 122 in the storage 12 of the information provision device 1, the "first correspondence data" that define the correspondence between the "specific information" and the "identifier" in advance. When a corresponding "identifier" is set for new "specific information" in the information provision device 1, the correspondence information between the "specific information" and the "identifier" is added to the identifier correspondence DB 122 and sent to the information obtaining device 4. Therefore, both the identifier correspondence DB 122 of the information provision device 1 and the identifier correspondence DB 422 of the information obtaining device 4 are updated so as to share the latest information.

The motif definition DB 423 includes, similar to the motif definition DB 123 in the storage 12 of the information provision device 1, the "second correspondence data" that define the rules (conditions) in advance for identifying the "identifier" from the "motif" that is a component of the design.

Both motif definition DB 123 of the information provision device 1 and the motif definition DB 423 of the information obtaining device 4 can share the same definition information.

The controller 41 in the present embodiment obtains an image, extracts a "motif" from the image, identifies an "identifier" from the "motif," and obtains the "specific information" corresponding to the "identifier". That is, when the reader 46 obtains an image of a printing result that has been printed on a nail as a print target (medium) based on the data of the design including an "identifier" associated with "specific information" in advance, the controller 41 obtains the image. The image of the printing result that has been printed on the nail to be obtained is not limited to the one sent from the reader 46 of the information obtaining device 4. The image taken by a reader that is separate from the information obtaining device 4 may be sent to and obtained by the controller 41.

The controller 41 also extracts the "identifier" from the image obtained by the reader 46. In the present embodiment, the "identifier" is included in the design as a "motif" that is a component of the design as described above, and controller 41 extracts the "motif" from the image. Specifically, the controller 41 extracts a numeral(s), symbol(s), shape(s), and the like that appears to be a "motif(s)" from the image, compares it with the registered "motif(s)" in the storage 42, and determines whether or not it is the "motif" that identify the "identifier".

For example, when the motif definition DB 423 stores the rule that only the dominant numeral that occupies the largest area in the design among multiple numerals in the image is recognized as the "motif" for identifying the "identifier", the numeral that is drawn largest in the image is extracted as the "motif".

Based on the "second correspondence data" that define the rules in advance for identifying the "identifier" from the "motif" that is a component of the design and are stored in the motif definition DB 423, the controller 41 identifies the "identifier" from the "motif".

Also, based on the "first correspondence data" that define the correspondence between the "specific information" and the "identifiers" and are stored in the identifier correspondence DB 422, the controller 41 also converts the "identifier" extracted from the image or identified from the "motif" extracted from the image into the "specific information" corresponding to the "identifier" and obtains the "specific information".

When the "specific information" includes an admission ticket number of an event, and when the controller 41 of the information obtaining device 4 is placed at an entrance gate, for example, a user who has a nail design (printing result) on his/her nail from which the controller 41 has obtained the "specific information" is allowed to pass through the entrance gate. In this case, the "specific information" is also the lock-opening information for unlocking the entrance gate, for example.

Alternatively, when the "specific information" includes a user's number at a specific facility such as a sports facility, a user who has a nail design (printing result) on his/her nail from which the controller 41 of the information obtaining device 4 at a reception desk has obtained the "specific information" is allowed to use the facility without showing a membership card or the like.

A personal terminal device such as a user's smartphone may function as the information obtaining device 4 with a dedicated application program, etc., for this information provision system installed.

In such a case, for example, the user first obtains an image of a nail design printed on a nail (printing result) with a camera in the terminal device while the dedicated application program installed in the terminal device is running. Then, the controller in the terminal device obtains an image, extracts a "motif" from the image, identifies an "identifier" from the "motif," and obtains "specific information" corresponding to the "identifier". As a result, the "specific information" (for example, a URL of a store's WEB site) corresponding to the "identifier" included in the nail design is accessible.

In order that the information obtaining device 4 (including cases where the information obtaining device is a personal terminal device) obtains the "specific information" corresponding to the "identifier" included in the design from the printing result based on the data of the design generated by the controller 11 of the information provision device 1, the information obtaining device 4 has to store the "identifier correspondence DB 422" and the "motif definition DB 423" which have the same contents as the "identifier correspondence DB 122" and the "motif definition DB 123" used for converting "specific information" into the corresponding "identifier" and for including it in the design as a "motif". Therefore, the information obtaining device 4 is connected to the network N, for example so as to be able to obtain (update) the latest "identifier correspondence DB" and the "motif definition DB" at any time.

When the controller 11 of the information provision device 1 converts an unknown address or the like ("specific information") into an "identifier" or a "motif" only according to a certain rule or definition, the information obtaining device 4 only needs to store information on such specific rule or definition as decoding information.

[Information Obtaining Method]

Next, with specific examples, the information obtaining method of the present embodiment will be explained.

Figure 4:
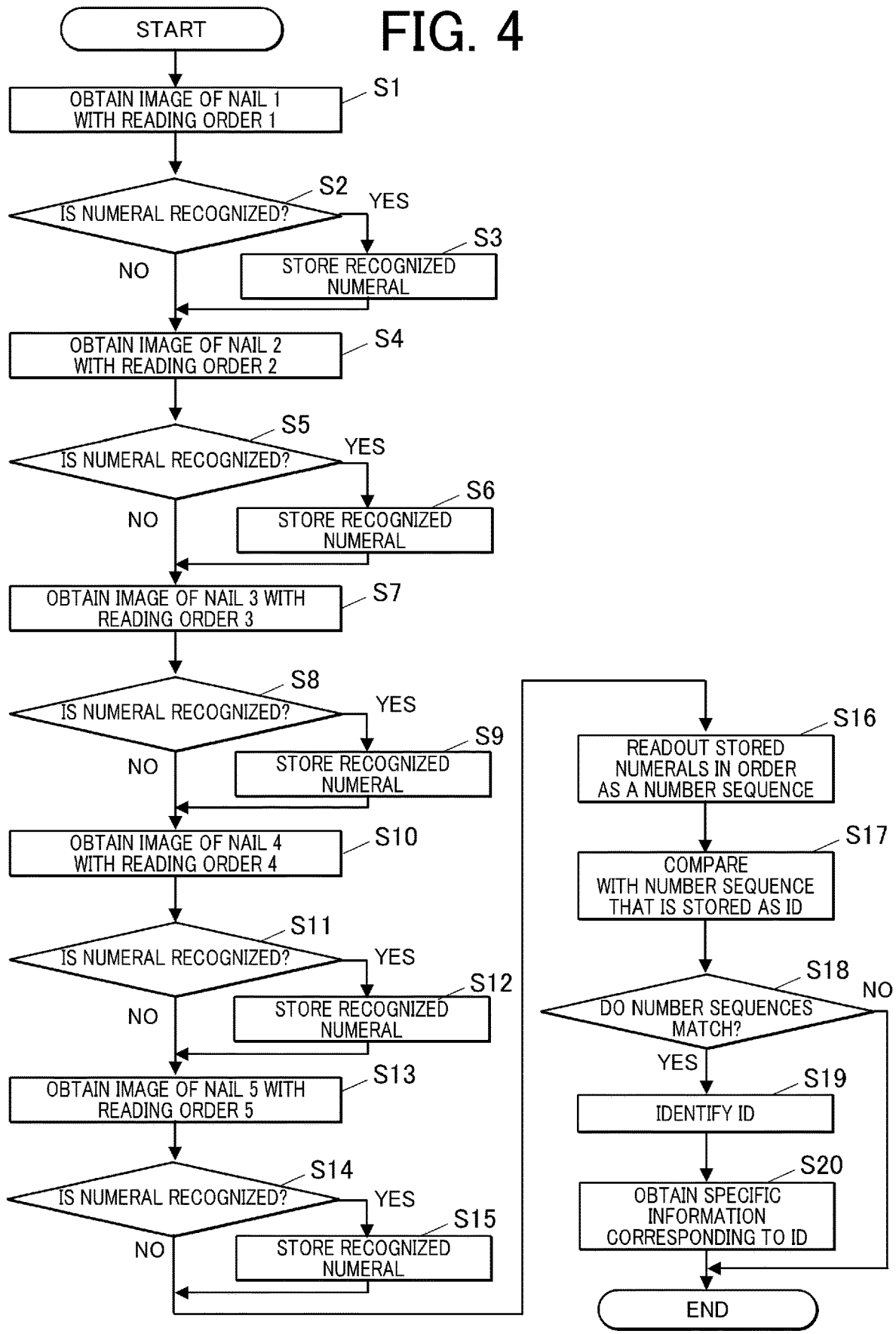
FIG. 4 is a flowchart showing an example of an information obtaining process.

FIG. 4 is a flowchart showing an example of a procedure of reading a "motif" from each fingernail, identifying an "identifier", and obtaining "specific information" corresponding thereto, when a design that includes the "motif" for identifying the "identifier" is divided and printed on multiple fingernails. In the procedure shown in FIG. 4, the information obtaining device 4 is not a dedicated reader, but a general terminal device such as a user's smartphone.

For example, in a case shown in FIG. 5 where the original basic nail design to include the "specific information" is a numeral design with randomly drawn numerals, and where the "motif" for identifying the "identifier" is the numeral that occupies the largest area in the design, the "identifier" is identified from the printing result, and the "specific information" corresponding to the "identifier" is obtained according to the steps illustrated in FIG. 4

For example, when fingers are arranged as shown in FIG. 3, the information obtaining device 4 (for example, a smartphone) images the nails on the fingers in an order along a certain reading direction and obtains the images. Here, an example will be described in which reading is done in an order from the right to the left as shown in FIG. 5, and the printing results on the five fingernails from the nail T1 on the thumb to the nail T5 on the little finger are read in order.

In this case, as illustrated in FIG. 4, the reader 46 of the information obtaining device 4 obtains an image of a nail 1, which is the first nail in the reading order (the thumb nail T1 arranged on the right side in the example in FIG. 5), and the controller 41 obtains the resulting image (Step S1). The controller 41 performs an imaging process, etc. on the obtained image to determine whether or not a numeral as a "motif" is recognized from the image (Step S2).

For example, if the hand is positioned in a state rotated 90 degrees clockwise (or anti-clockwise) from that shown in FIG. 3, the reading may be done in an order from the bottom to the top (or top to bottom), or a reading error may be recognized with a requirement to reposition the hand such that the nails and fingers are arranged in the state shown in FIG. 3, for example.

The thumb nail T1 is usually the largest of all the nails in the hand, and the little finger nail T5 is the smallest. For this reason, the size of the nails located at respective ends in the reading screen 461 may be compared, and reading may be done in order, starting with the nail having the larger size (or the nail having the smaller size). Based on the determination of the position of the thumb nail T1 and the little finger nail T5 in the reading screen 461 and whether to read from the thumb nail T1 or the little finger nail T5, the reading order of the other fingers can be easily identified.

Since the fingers of the hand actually have different lengths as illustrated in FIG. 3, the nails T1 to T5 are not aligned side by side as shown in FIG. 5. Therefore, coordinate (X coordinate) values indicating the position in the horizontal direction may be obtained from the nails T1 to T5 of the respective fingers in the reading screen 461 of FIG. 3, such that reading is done in an order depending on the coordinate values. For example, when reading is started from the thumb nail T1, the reading is done from the nail with the largest coordinate toward the nail with the smallest coordinate.

When only the thumb is arranged pointing differently from the other fingers as in FIG. 7, the order of reading may be determined as follows. First, only the thumb nail T1 is read, and the result is stored in the storage 42, etc. as an edge character. For the nails of the other fingers, based on the coordinate of the little finger nail T5, which is easily recognized due to its smallest size, readings are done in the order from the nail with the smallest coordinate (X-coordinate) indicating the position in the horizontal direction to the nail with the largest coordinate (from right to left in the example illustrated in FIG. 7).

Figures 8, 9, 10:
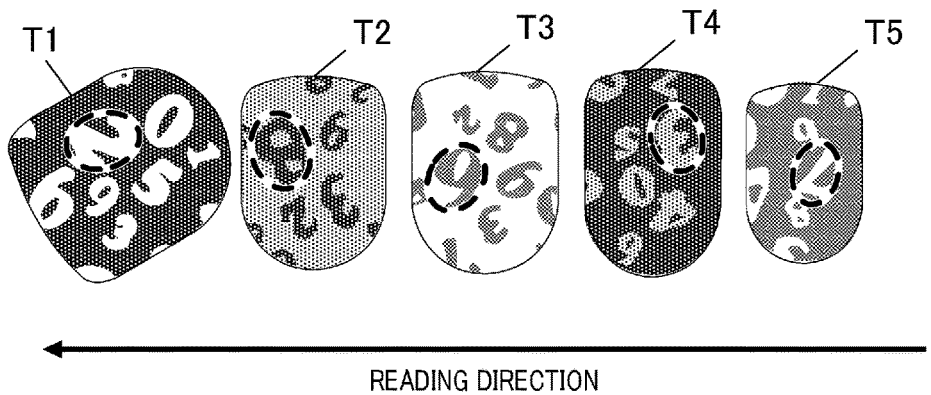
FIG. 8 is a diagram illustrating an example of a printing result on the nails arranged as illustrated in FIG. 7.
FIG. 9 is an example of data configuration schematically showing specific information associated with identifiers when the identifiers are number sequences.
FIG. 10 is an example of data configuration schematically showing specific information associated with identifiers when the identifiers are color schemes.

The reading order of the nails may be determined in advance, for example, based on the color scheme (for example, a background color printed on the nail when a motif such as a character is included, as illustrated in FIG. 5 and FIG. 8). For example, if it is determined in advance that the reading is done in the order of "yellow," "gray," "orange," "red," and "white," the color scheme (background color, etc.) of each nail is read, and the reading is done in the order of the recognized "yellow," "gray," "orange," "red," and "white" nails, regardless of the alignment of the nails.

The number of the nails (fingers) to be read is not limited to five but may be four or less. For example, reading is done from four nails T2 to T5 excluding the thumb nail, four nails T1 to T4 excluding the little finger nail, and the like. The nails (fingers) of both hands may also be read. In this case, the reading target may include nails of all fingers of both hands, or nails of a part of the fingers, such as only the nails T1 of thumbs of both hands.

The controller 41 refers to the information stored in the motif definition DB 423 to determine in which order to read the nails and obtain images thereof, from which nails to read the "motif" for identifying the "identifier", and the like.

The controller 41 also refers to the information stored in the motif definition DB 423 to determine which numeral, etc. is the "motif" for identifying the "identifier". For example, in accordance with the rule that the "motif" is the numeral that occupies the largest area among the multiple numerals in the design, the numeral "2" surrounded by a dotted line in FIG. 5 is a "motif". If a numeral as a "motif" is recognized (Step S2; YES), the controller 41 stores the number represented by the numeral in the storage 42 (Step S3). On the other hand, if a numeral as a "motif" cannot be recognized in the image (Step S2; NO), the controller 41 does not store a number for the first nail 1 in the reading order and proceeds to the next step. The numeral as a "motif" cannot be recognized when, for example, all the numerals in the image are the same size and cannot be determined as large or small, or when nothing that is recognized as a "numeral" has been read in the image.

Next, the reader 46 of the information obtaining device 4 obtains an image of a nail 2, which is the second nail in the reading order (the nail T2 of the index finger arranged on the left side of the nail T1 of the thumb in the example in FIG. 5), and the controller 41 obtains the resulting image (Step S4). The controller 41 performs an imaging process, etc. on the obtained image to determine whether or not a numeral as a "motif" is recognized from the image (Step S5). If a numeral as a "motif" is recognized (Step S5; YES, for example, the numeral "8" surrounded by a dotted line in the nail T2 of the index finger in FIG. 5), the controller 41 stores the number represented by the numeral in the storage 42 (Step S6). On the other hand, if a numeral as a "motif" cannot be recognized in the image (Step S5; NO), the controller 41 does not store a number for the second nail 2 in the reading order and proceeds to the next step.

Then, the reader 46 of the information obtaining device 4 obtains an image of a nail 3, which is the third nail in the reading order (the nail T3 of the middle finger arranged on the left side of the nail T2 of the index finger in the example in FIG. 5), and the controller 41 obtains the resulting image (Step S7). The controller 41 performs an imaging process, etc. on the obtained image to determine whether or not a numeral as a "motif" is recognized from the image (Step S8). If a numeral as a "motif" is recognized (Step S8; YES, for example, the numeral "6" surrounded by a dotted line in the nail T3 of the middle finger in FIG. 5), the controller 41 stores the number represented by the numeral in the storage 42 (Step S9). On the other hand, if a numeral as a "motif" cannot be recognized in the image (Step S8; NO), the controller 41 does not store a number for the third nail 3 in the reading order and proceeds to the next step.

Then, the reader 46 of the information obtaining device 4 obtains an image of a nail 4, which is the fourth nail in the reading order (the nail T4 of the ring finger arranged on the left side of the nail T3 of the middle finger in the example in FIG. 5), and the controller 41 obtains the resulting image (Step S10). The controller 41 performs an imaging process, etc. on the obtained image to determine whether or not a numeral as a "motif" is recognized from the image (Step S11). When a numeral as a "motif" is recognized (Step S11; YES, for example, the numeral "3" surrounded by a dotted line in the nail T4 of the ring finger in FIG. 5), the controller 41 stores the number represented by the numeral in the storage 42 (Step S12). On the other hand, if a numeral as a "motif" cannot be recognized in the image (Step S11; NO), the controller 41 does not store a number for the fourth nail 4 in the reading order and proceeds to the next step.

Then, the reader 46 of the information obtaining device 4 obtains an image of a nail 5, which is the fifth nail in the reading order (the nail T5 of the little finger arranged on the left side of the nail T4 of the ring finger in the example in FIG. 5), and the controller 41 obtains the resulting image (Step S13). The controller 41 performs an imaging process, etc. on the obtained image to determine whether or not a numeral as a "motif" is recognized from the image (Step S14). If a numeral as a "motif" is recognized (Step S14; YES, for example, the numeral "7" surrounded by a dotted line in the nail T5 of the little finger in FIG. 5), the controller 41 stores the number represented by the numeral in the storage 42 (Step S15). On the other hand, if a numeral as a "motif" cannot be recognized in the image (Step S14; NO), the controller 41 does not store a number for the fifth nail 5 in the reading order and proceeds to the next step.

When the reading is completed for all nails to be read (in the example shown here, five nails T1 to T5 from the thumb to the little finger), the controller 41 sequentially reads out the numbers stored in the storage 42 as a number sequence in order (Step S16).

FIG. 6 is a table summarizing the reading results of the designs printed on the nails (nail designs), which are the printing results, read sequentially from right to left as shown in FIG. 5.

The "finger number" in the table is a number indicating the reading order of the nails. The finger numbers set for the respective fingers (thumb to little finger) are "1" to "5" as shown in the first line of the table in FIG. 6, respectively corresponding to thumb nail T1 to little finger nail T5. In the second row of the table in FIG. 6, the dominant numeral in each nail design is indicated when the nails have been read in the reading order.

In the second row of the table in FIG. 6, the dominant numeral in each nail design is indicated. Here, the numeral that occupies the largest area in the design is assumed to be defined as the "dominant numeral" in the "motif definition DB" 423.

In this example, when readings are performed sequentially from the thumb on the right end, the numbers "2", "8", "6", "3", and "7" are stored sequentially in the storage 4 as "motifs", and the number sequence as an "identifier" extracted from the images by the controller 41 is "28637".

The user may be requested to hold the nails with a different finger arrangement from that illustrated in FIG. 3. In this case, the order of reading fingers may be defined in advance.

For example, when the nails T1 to T5 on which the respective designs illustrated in FIG. 5 are printed are arranged with the hand clasped as shown in FIG. 7 and read from right to left in the same manner as above, the reading is performed in the order from the nail T5 of the little finger to the nail T1 of the thumb as shown in FIG. 8, contrary to the case where the fingers are arranged as in FIG. 3. Furthermore, the resulting nail images are upside down except for the thumb. When the numbers are read out in the order in which they are read and stored, the number sequence is "73682". The numeral on the nail T3 of the middle finger in FIG. 5, which is recognized as "6", may be recognized as "9" depending on the font type and orientation of the numeral. For such a character that is recognized as a different character when turned upside down, a dot or bar may be placed above or below the numeral to specify the direction in which the character is read, or such a character may be removed from the candidate numeral that constitutes the "motif".

After extracting the number sequence, the controller 41 compares the number sequence extracted from the image with the number sequence stored as the "identifier" ("ID" in FIG. 4 and the like) (Step S17).

The controller 41 determines whether or not the number sequences match each other (Step S18). If the number sequences match each other (Step S18; YES), the controller 41 identifies the extracted number sequence as an "identifier" (Step S19).

When the "identifier" is identified, the controller 41 refers to the "identifier correspondence DB" 422, converts the "identifier" into the "specific information" corresponding to the "identifier" based on the first "correspondence data" that defines the correspondence between the "specific information" and the "identifier" in advance, and obtains the "identifier" (Step S20).

If the number sequences do not match each other (Step S18; YES), the process is finished.

FIG. 9 is a correspondence table showing an example of the first correspondence data that defines the correspondence between the "specific information" and the "identifier" in advance.

As illustrated in FIG. 9, the number sequence "28637" recognized as the "identifier" corresponds to the "specific information" that is the URL "https://www.***.com/.jp/". For example, when the number sequence "28637" is read as the "identifier" from the image of the design printed on the nail, access to "https://www.*.com/**.jp/" may be automatically performed.

For example, if the nails are arranged as illustrated in FIG. 7 and read in the order illustrated in FIG. 8, the number sequence "73682" is identified as the "identifier" corresponding the "specific information" that is the URL "http://www.△△△.com/**.jp/". For example, when the number sequence "73682" is read as the "identifier" from the image of the design printed on the nail, access to "http://www.△△△.com/**.jp/" may be automatically performed.

The "motif" for identifying the "identifier" is not limited to include numerals and the like.

For example, the third column of the table in FIG. 6 shows the reading results for the color (color scheme) used for each nail design. For example, the design for the nail T1 on the thumb consists of a gray background color and white numerals; the design for the nail T2 on the index finger consists of a yellow background color and gray numerals. Such a combination of the background color and the color of a design (numerals in the drawing) that can be a "motif" can also be a "motif" for identifying an "identifier" alone or in combination.

That is, for example, the reading order may be designated by the finger number, and each "identifier" identified by the color scheme (background color) of each nail design may correspond to a URL as "specific information". For example, when the nails are read in the order of finger numbers 1, 2, 3, 4, and 5, and their background colors identified as the "identifier" are respectively gray, yellow, white, gray, and orange as shown in FIG. 10, access to the URL "http://www.***.com/**.jp/", which is the corresponding "specific information", may be allowed.

The "motif" may be a monochromatic design with no characters.

There is no particular limitation on how to recognize the color. For example, when a numerical value (RGB value, etc.) recognized from the color of the design is close to the numerical value that has been registered as "yellow", the recognition result of "yellow" is stored in storage 42 and the like.

On the other hand, when the information obtaining device 4 is a dedicated reading device placed at an entrance of a store, an entrance gate of an event venue, or the like, unlike the reading of printing results on nails one by one using the user's smartphone or the like described above, a dedicated reader may image multiple nails of fingers together, such as the five fingers of one hand, and read them all at once.

Figure 11:
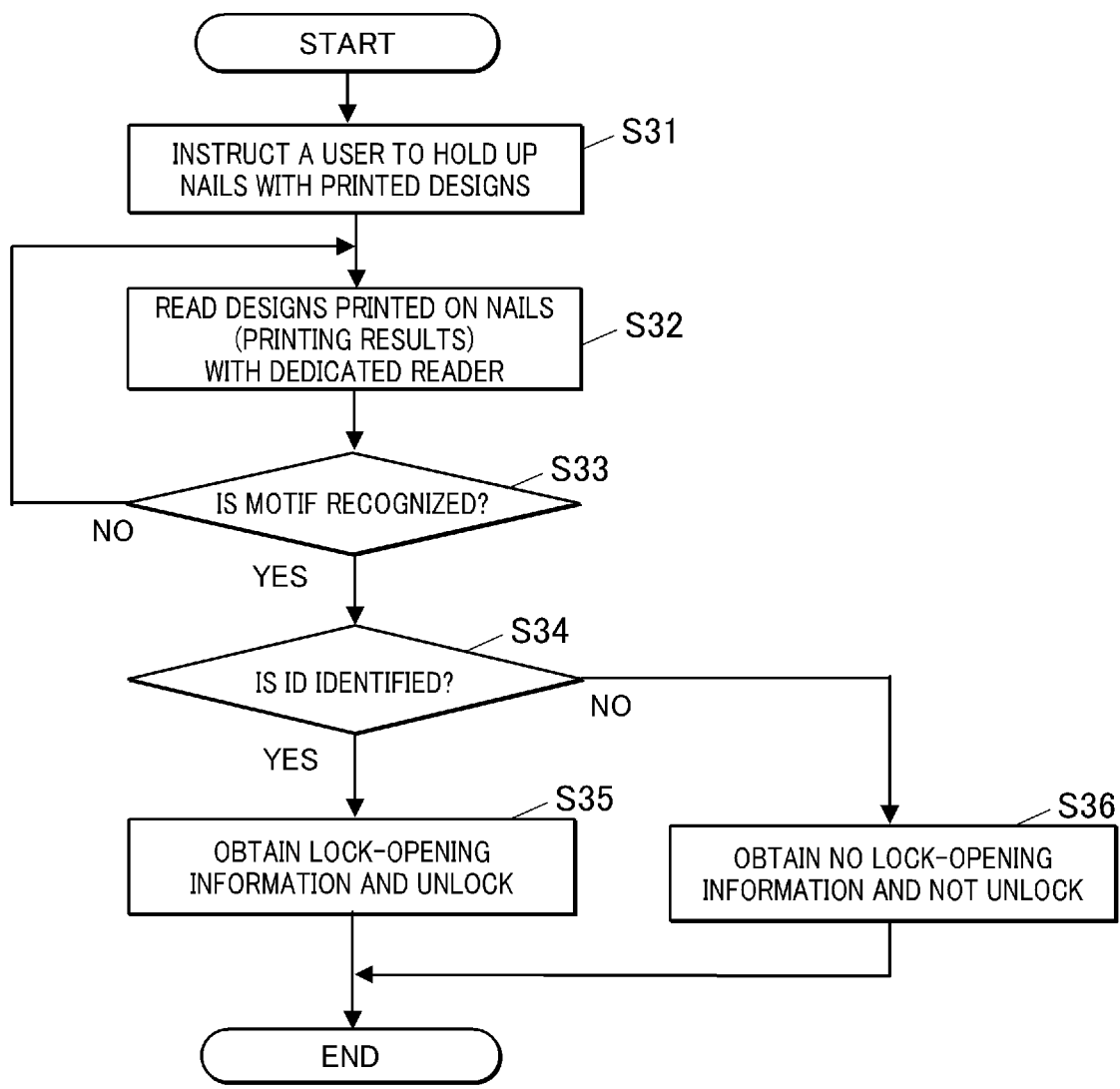
FIG. 11 is a flowchart showing an example of an information obtaining process.

FIG. 11 illustrates an example of the procedure in this case.

That is, the information obtaining device 4 instructs the user to hold up the nails on which designs have been printed (Step S31). When the user holds up the nails in accordance with this instruction, the reader 46 of the information obtaining device 4 reads the designs (printing results) printed on the nails all at once (Step S32). The instruction to hold up the nails may be displayed on the reading screen 461 (not shown in the drawing) of the information obtaining device 4, or may be provided by voice or other means.

The controller 41 obtains an image(s) and determines whether or not a "motif" has been extracted (recognized) from the read image (Step S33). The controller 41 obtains an image(s) and determines whether or not a "motif" has been extracted (recognized) from the read image (Step S33). If no "motif" is extracted (Step S33; NO), the process returns to Step S32 and repeats the process therein.

On the other hand, if a "motif" is extracted (Step S33; YES), the controller 41 further determines whether an "identifier" has been identified from the extracted "motif" (Step S34).

If the "identifier" has been identified (Step S34: YES), the controller 41 obtains "specific information" corresponding to the "identifier". If, for example, the "specific information" is information on the membership number to use the facility or the ticket number to participate in the event, and the "identifier" can be identified from the image of the printing result, a user who has the printing result(s) on her/his nail is allowed to enter the facility or participate in the event (Step S35).

On the other hand, if the "identifier" has not been identified (Step S34; NO), the "specific information" cannot be obtained. Then, since information on the membership number to use the facility or the ticket number to participate in the event cannot be confirmed, the user is not allowed to enter the facility or participate in the event (Step S36).

The "motifs" for identifying the "identifier" are not limited to being included in designs drawn on multiple nails of fingers in a dispersed manner. For example, an "identifier" may be identified from a "motif(s)" in a design drawn on a single nail.

Figure 12:
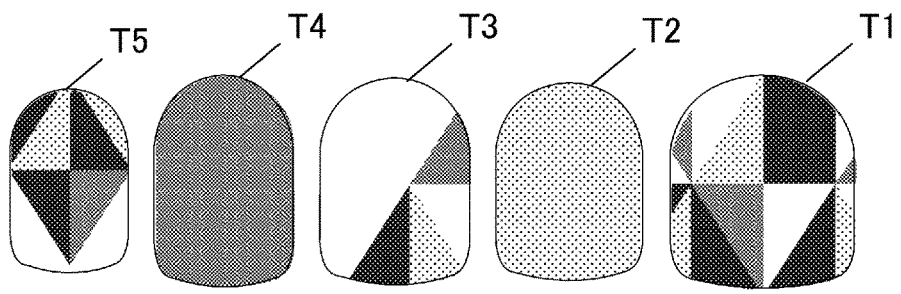
FIG. 12 is a diagram illustrating an example of a printing result on nails of five fingers.

For example, when geometric pattern-like shapes are printed on five nails of fingers from the nail T1 of the thumb to the nail T5 of the little finger as shown in FIG. 12, one of the nails may include all the "motif(s)" for identifying the "identifier". When one nail includes all the "motif(s)", the design including the "motif(s)" is preferably printed on a nail with a relatively large print area, for example, on the nail T1 of the thumb, rather than on a small nail such as the nail T5 of the little finger.

Figure 13:
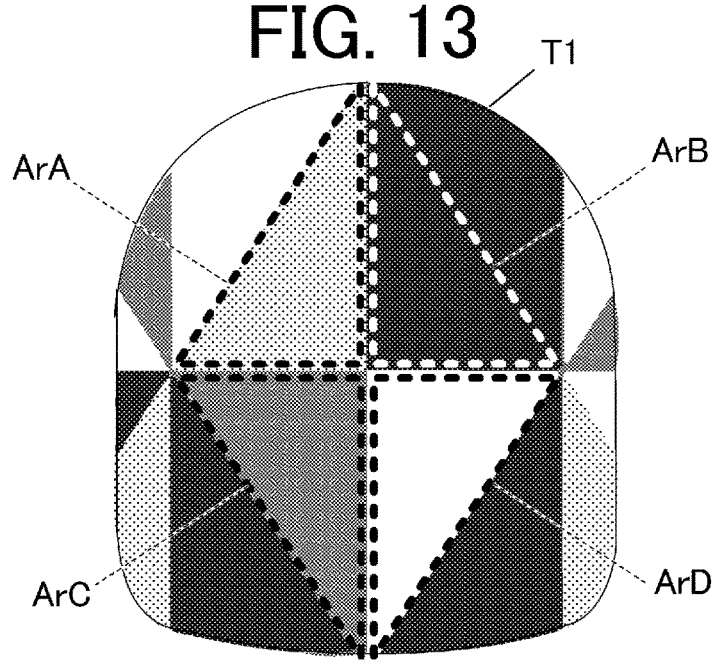
FIG. 13 is a diagram illustrating an example of area division of a nail design printed on a nail of a thumb.
Figure 14:
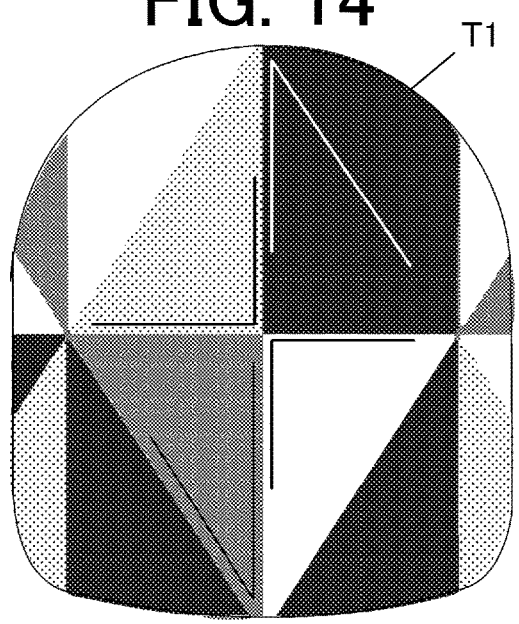
FIG. 14 is a diagram illustrating an example of a printing result including motifs printed on a nail of a thumb.

FIG. 13 illustrates an example of the nail T1 of the thumb having four areas (area ArA, area ArB, area ArC, and area ArD). FIG. 14 illustrates an example of an arrangement of symbols or shapes as motifs in the respective areas (area ArA, area ArB, area ArC, and area ArD). The symbols or shapes as the "motifs" are associated with, for example, numbers, in advance in the "motif definition DB" 423 and the like.

FIG. 15 illustrates an example of data listing the shapes as the "motifs" and the numbers associated with the respective shapes.

Also, as shown in FIG. 16, the areas (area ArA, area ArB, area ArC, and area ArD in FIG. 13) may correspond to respective numbers.

Figure 17:
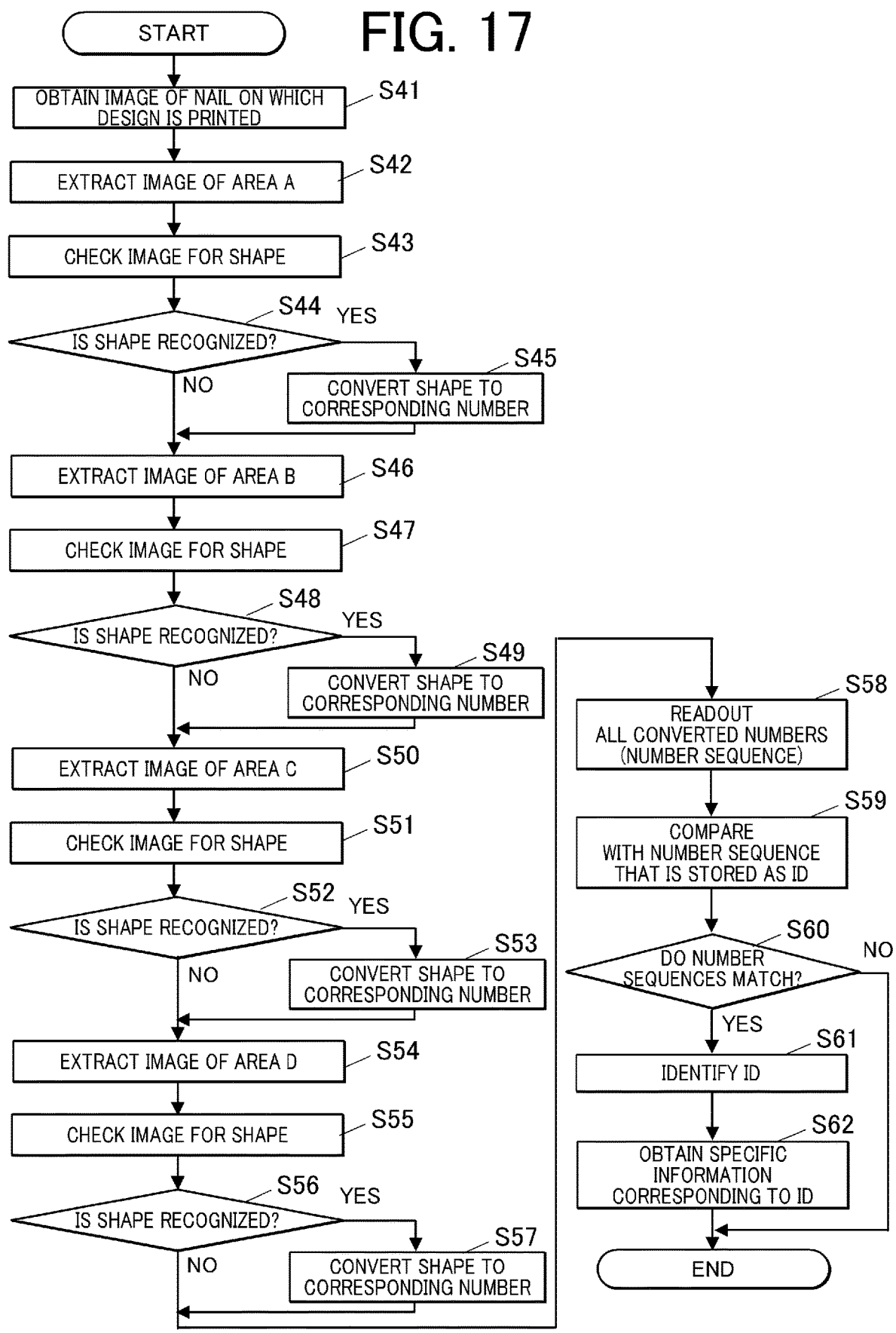
FIG. 17 is a flowchart showing an example of an information obtaining process.

FIG. 17 is a flowchart showing a procedure of identifying the "identifier" from all the "motifs" in one nail and obtaining the "specific information".

As shown in FIG. 17, in this case, the reader 46 of the information obtaining device 4 first obtains an image of the nail on which a design including "motifs" to identify the "identifier" are printed, and the controller 41 obtains an image of the printing result (Step S41). The controller 41 extracts an image of area ArA from the obtained image (Step S42) and checks for the presence or absence of a shape as a "motif" (Step S43). Then, the controller 41 determines whether or not a shape as a "motif" has been recognized (Step S44). If a shape has been recognized as a "motif" (Step S44; YES), the controller 41 converts the shape to the corresponding number (Step S45). The controller 41 determines which shape corresponds to a "motif" and which number corresponds to the "motif" by referring to the information stored in the motif definition DB 423, etc.

On the other hand, if a shape has not been recognized as a "motif" (Step S44; NO), the controller 41 extracts an image of the next area (for example, area ArB illustrated in FIG. 13) (Step S46) and, in the same manner as in the area ArA, checks for the presence of a shape as a "motif" (Step S47). Then, the controller 41 determines whether or not a shape as a "motif" has been recognized (Step S48). If a shape has been recognized as a "motif" (Step S48; YES), the controller 41 converts the shape to the corresponding number (Step S49).

On the other hand, if a shape has not been recognized as a "motif" (Step S48; NO), the controller 41 extracts an image of the next area (for example, area ArC illustrated in FIG. 13) (Step S50) and, in the same manner as in the area ArA, checks for the presence of a shape as a "motif" (Step S51). Then, the controller 41 determines whether or not a shape as a "motif" has been recognized (Step S52). If a shape has been recognized as a "motif" (Step S52; YES), the controller 41 converts the shape to the corresponding number (Step S53).

On the other hand, if a shape has not been recognized as a "motif" (Step S52; NO), the controller 41 extracts an image of the next area (for example, area ArD illustrated in FIG. 13) (Step S54) and, in the same manner as in the area ArA, checks for the presence of a shape as a "motif" (Step S55). Then, the controller 41 determines whether or not a shape as a "motif" has been recognized (Step S56). If a shape has been recognized as a "motif" (Step S56; YES), the controller 41 converts the shape to the corresponding number (Step S57).

After determining the presence or absence of a shape for all the areas (areas ArA to ArD in the example illustrated in FIG. 13), the controller 41 then reads out all the numbers converted from the shapes as a number sequence (Step S58). Then, the controller 41 compares the number sequence that has been read out with the number sequence stored as the "identifier" ("ID") (Step S59). The controller 41 determines whether or not the number sequences match each other (Step S60). If the number sequences do not match each other (Step S60; NO), the controller 41 finishes the process, concluding that there is no "identifier" corresponding to "specific information".

On the other hand, if the number sequence that has been read out match the number sequence stored as the "identifier" (Step S60; YES), the controller 41 identifies the "identifier" (Step S61) and obtains the "specific information" corresponding to the "identifier" (Step S62).

For example, if areas are checked in the order of area ArA, area ArB, area ArC, and area ArD, the numbers represented by the shapes, which are "motifs" in respective areas, are "9", "2", "3", and "8". The number sequence derived from these numbers matches the number sequence "9238" stored as the "identifier". In this case, the URL "https:// www.***.com/**.jp/" stored in the identifier correspondence DB 422 as a URL corresponding to the number sequence "9238" is the "specific information", and access to the URL may be automatically performed.

As illustrated in FIG. 16, the areas (area ArA, area ArB, area ArC, and area ArD in FIG. 13) may correspond to respective numbers. In this case, the number sequence extracted by checking the areas in a designated order is identified as the "identifier".

A single number sequence may correspond to different "specific information" depending on the reading time, day, etc. at which the image of the printing result is read. FIG. 19 illustrates an example in which the "identifier" "9238" identified by reading area ArA to area ArD in that order corresponds to the code "58akdo378" when the reading time is between 0:00 and 5:59 and corresponds to the code "98knfub88" when the reading time is between 6:00 and 11:59.

Furthermore, when a design corresponding to a code that is a membership number of a facility user is printed on the nail, for example, the accessible URL can be set differently depending on the time, or the security lock may be set to be released only at certain time. When the valid "identifier" is set to be different depending on the time, for example, a user holding up a nail with a certain design on it is allowed to use the facility during a certain time period(s) of the day, but not allowed during the rest of the day.

The definition regarding a motif that identifies the "identifier" required for entry may be set invalid after a predetermined period of time, such that the "identifier" can continue to be available by another user.

For example, the "motif" that identifies the "identifier" may be a shape that constitutes the design and that is associated with a numeric value in advance.

Figures 20, 21, 22:
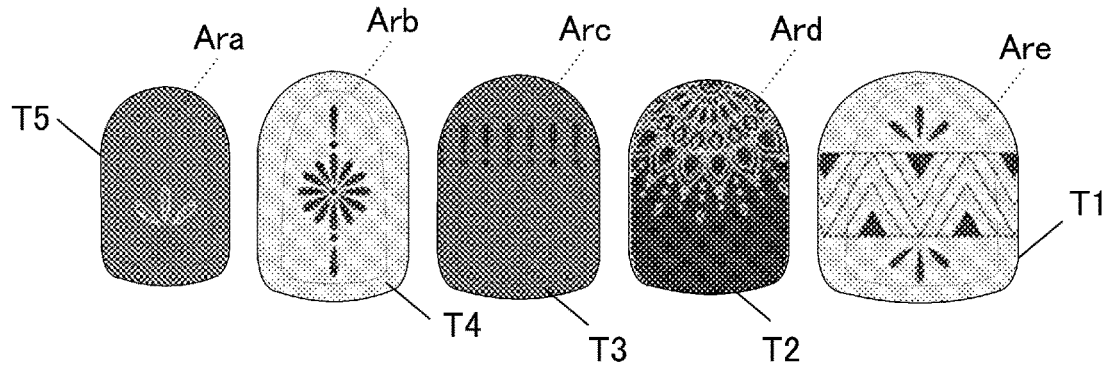
FIG. 20 is a diagram illustrating an example of a printing result on nails of five fingers.
FIG. 21 is an example of correspondence data illustrating numerical values associated with respective shapes when motifs are the shapes.
FIG. 22 is an example of data configuration schematically showing specific information associated with identifiers when the identifiers are each a total of numerical values associated with shapes as motifs.

For example, the numerical value corresponding to the shape drawn in each of the reading target areas (area Ara to area Are) set in the nails as illustrated in FIG. 20 may be obtained as the "identifier".

At the edge of the printed nails, ink tends to peel off or deteriorate. Therefore, the reading target area in which a "motif" for identifying an "identifier" is arranged is preferably within an area excluding the edge of each nail. When setting the reading target area, information on the range of the reading target area is also stored in, for example, the motif definition DB 423.

FIG. 21 is a correspondence table in which each "motif" is associated with a corresponding numerical value. For example, "● (filled circle)" is associated with the numerical value "1". The correspondence table is stored in, for example, the motif definition DB 423.

FIG. 22 is an example of a data table that shows "motifs" arranged in the reading target areas (area Ara to area Are), numeric values as "identifiers" for respective read target areas calculated by summing numeric values that are conversion results of the motifs, and URLs as "specific information" corresponding to the respective numeric values.

Figure 23:
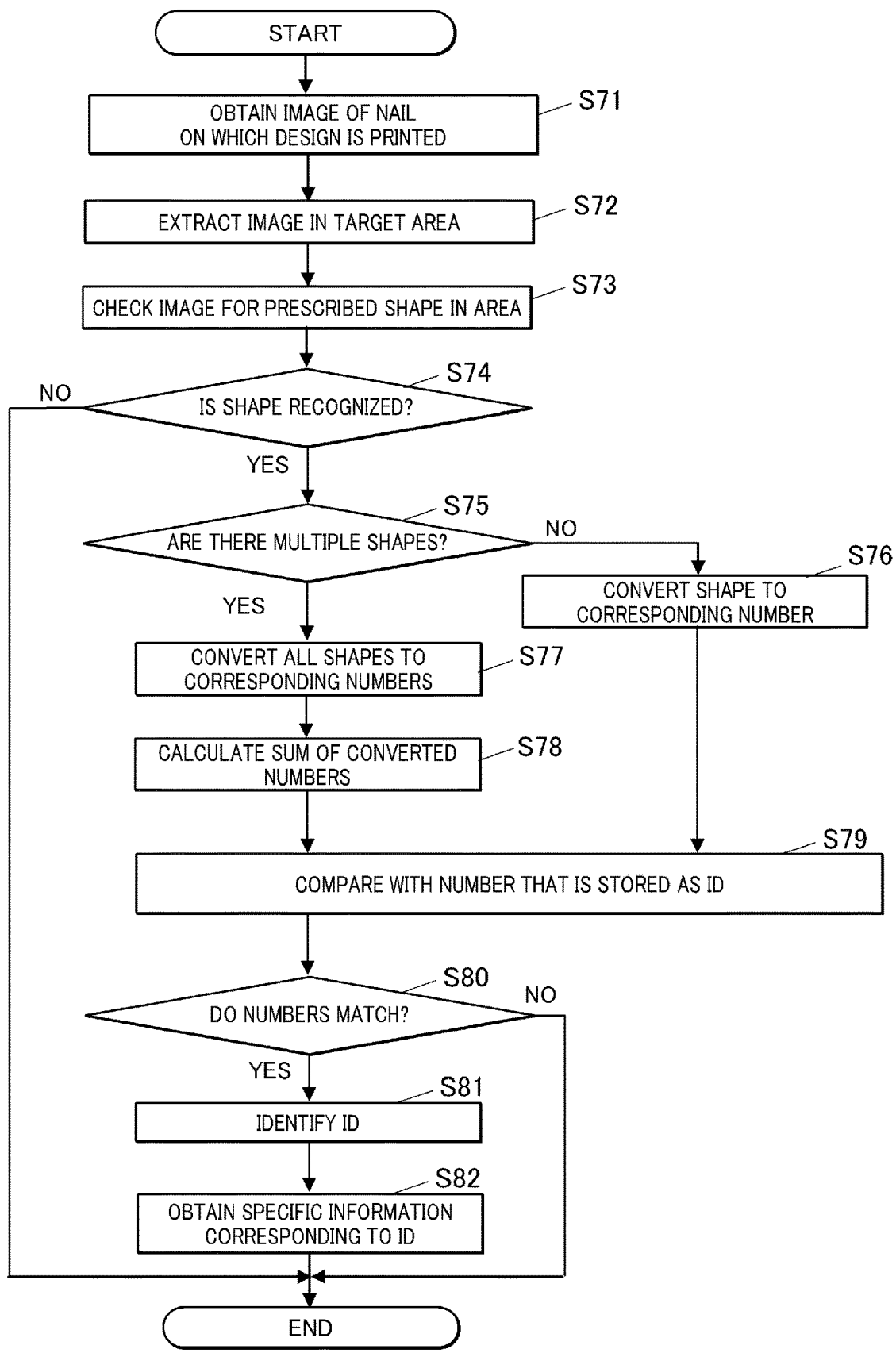
FIG. 23 is a flowchart showing an example of an information obtaining process.

FIG. 23 is an example of a flowchart showing the process in which the sum of the numerical values of the "motifs" in the reading target area is used as the "identifier".

As shown in FIG. 23, first, the reader 46 of the information obtaining device 4 obtains an image of the nail on which a design including a "motif" for identifying the "identifier" is printed, and the controller 41 obtains an image of the printing result (Step S71). The controller 41 extracts an image of a reading target area (area Ara to area Are, depending on the nail, as shown in FIG. 20) from the obtained image (Step S72), and checks for the presence or absence of a shape as a "motif" (defined as shown in FIG. 21, etc.) in the reading target area (Step S73).

The controller 41 determines whether or not a shape specified as a "motif" has been recognized (Step S74). If no such shape has been recognized (Step S74; NO), the controller 41 finishes the process.

On the other hand, if the shape specified as a "motif" has been recognized (Step S74; YES), the controller 41 further determines whether or not there are there are multiple such shapes (Step S75). If there is only one such shape (Step S75; NO), the controller 41 converts the shape to the corresponding numerical value according to the corresponding and the like shown in FIG. 21 (Step S76). In the example illustrated in FIG. 20 to FIG. 21, there is one shape "● (filled circle)" in the reading target area Ara set in the nail T5 of the little finger, and the corresponding numerical value is "1".

On the other hand, if there are multiple such shapes in the reading target area (Step S75; YES), the controller 41 converts all the shapes to the corresponding numeric values (Step S77) and calculates the sum of the numeric values by adding them together (Step S78).

In the example illustrated in FIG. 20 to FIG. 21, there are four shapes of "!" in the reading target area Arc which is set in the nail T3 of the middle finger. The shapes of "!" each corresponds to a numeric value of "2", therefore, the sum of the numeric values, the conversion results, is calculated to be "8" by multiplying "2" by 4.

After the only one shape as a "motif" in the reading target area has been converted to a numeric value (Step S76), or after the multiple shapes as "motifs" in the reading target area have been converted to numeric values and totaled (Step S78), the controller 41 compares the numeric value with the numeric value stored as the "identifier" (Step S79).

Then, the controller 41 determines whether or not the numerical value converted from the "motif" and the numerical value stored as the "identifier" match each other (Step S80). If they do not match each other (Step S80; NO), the controller 41 finishes the process. If they match each other (Step S80; YES), the controller 41 identifies the "identifier" and obtains the "specific information" corresponding to the "identifier".

Thus, when the "identifier" can be identified in each area, the reader 46 of the information obtaining device 4 can obtain multiple kinds of "specific information" just upon the user holding up different nails.

For example, in the example shown in FIG. 22, when the numerical value "1" is identified as the "identifier" in the reading target area Ara of the nail T5 of the little finger, the URL "https://www.***.com/.jp/" is obtained as the "specific information", and access to that address is allowed. When, for example, the numeric value "8" is subsequently identified as the "identifier" in the reading target area Arc of the nail T3 of the middle finger, the URL "http://www.△△△.com/**.jp/" is obtained as the "specific information", and access to that address is also allowed.

With the information obtaining method of the present embodiment, it is possible to perform nail printing on nails that enables "specific information" to be read without impairing the visual design. Therefore, nail printing can be used as a simple information tool in any situation, without the unfashionability, discomfort, or the like that may be caused by two-dimensional codes, etc. printed as is.

The nail design printed on the nail as an information tool is not limited to applications in the above examples, but can be used for various purposes. For example, the "specific information" is not limited to complex character information such as a URL, but can be a short phrase such as "thank you" or "I'm sorry". By simply having the person read the image printed on the nail, messages that are difficult to be expressed verbally can be given without conversation.

In addition, when information on store discounts or recommendations is printed as a nail design on the nail of a store clerk, a customer can obtain necessary and useful information simply by reading the design printed on the nail of the clerk with a smartphone or the like. Thus, the store clerk and customers can communicate with each other without contact and without verbal communication.

The "specific information" that can be included in the design may be a PIN number, membership number, and the like. In this case, the user can wear the information that needs to be readily available for reference when necessary, but that is not to be seen by others as a nail design.

Also, a design that includes emergency contact telephone numbers, etc. as the "specific information" may appear to be a part of fashion, but can also be useful as a tool for identification of persons in need of protection in an emergency, etc.

In addition, when a design including information on certification of immunization or vaccination as "specific information" is printed on a nail, items required for entry are confirmed simply by reading of the nail at a store that supports the information obtaining method of the present embodiment.

The information obtaining method of the present embodiment as described above includes: obtaining an image of a printing result when a design including an "identifier" associated with "specific information" in advance is printed on a nail and the like as a printing target; extracting the "identifier" included in the design from the image; and converting the "identifier" to the "specific information" that has been associated with the "identifier" to obtain the "specific information".

This allows various types of information ("specific information") to be printed on the nail without impairing the design and aesthetic quality when printed on the nail as a nail print.

The "identifier" of the present embodiment is identified by a "motif" or a combination of "motifs" included in the design as a component(s).

This allows the "specific information" to be used without impairing the design.

The "identifier" of the present embodiment may be identified based on an arrangement of the "motifs" that are the components of the design in a predetermined direction, based on an arrangement of the "motifs" that are the components of the design in a predetermined area, or based on the "motif" that is determined to be dominant based on its size or arrangement.

This allows, in the present embodiment, the "identifier" for obtaining the "specific information" to be set freely. This also allows the design to include the "identifier" (the "motif" for identifying the "identifier"). This makes it possible to achieve both well-designed nail printing and access to various types of "specific information".

In the present embodiment, the "motif" as the component of the design includes at least one of a letter, a numeral, a symbol, and a color scheme.

In this way, elements commonly used in nail designs can be used as the "identifier" (the "motif" for identifying the "identifier"). Therefore, it is possible to print information (the "identifier" corresponding to the "specific information") for accessing various "specific information" on the nail with a comfortable design.

The printing target is a nail of a finger or a toe in the present embodiment.

Since a membership card, ticket, etc. that is essential to receive various services is printed on a nail that is a part of the body and can be carried around, it is possible to prevent forgetting to carry it or leaving it behind. Also, when "specific information" such as ticket information can be read from the nail, paper waste from printing tickets can be reduced.

Also, because various "specific information" can be accessed using the "identifiers" ("motifs" for identifying the "identifiers") printed on the nails, it is possible to easily exchange information and communicate with others simply by holding the nail over a reader.

In addition, since the exchange of addresses and other information is completed by holding a smartphone or other device over a nail, it is possible to exchange information in a simple, non-contact manner.

Also, in the present embodiment, the "specific information" is converted to the "motif" (the "identifier" identified from the "motif") that constitutes the design and printed on the nail. This has the advantage that various services that require authentication can be used without impairment of the design, unlike a configuration in which "specific information" such as a QR code is printed as it is.

The reading and authentication may be performed in two or more steps. For example, after reading of the nails while the hand is open as shown in FIG. 3, further reading of the nails in a different orientation as shown in FIG. 7 or the recognition of both hands may be performed. This reduces the possibility of, for example, nails being unknowingly photographed and misused.

Although one or more embodiments of the present disclosure have been described above, it goes without saying that the present disclosure is not limited to the embodiments, and can be modified in a variety of respects without departing from its scope.

For example, in the present embodiment, the information provision device 1 and the information obtaining device 4 have the common identifier correspondence DB 122, 422 and have the common motif definition DB 123, 423. However, the information obtaining device 4 may not have the identifier correspondence DB 422 or the motif definition DB 423.

In this case, the information obtaining device 4 may access the information provision device via network N, etc., as necessary, refer to the contents stored in the identifier correspondence DB 122 and the motif definition DB 123, and perform the information obtaining process.

In the present embodiment, the nail printing is mainly performed directly on the nails, but the printing target by the printing device 3 is not limited to the nails.

For example, a design including the "identifier" ("motif" for identifying the "identifier") corresponding to the "specific information" may be printed on a medium to be attached to the nail, such as a nail sticker or a nail tip.

In this case, the information provider may provide the user with a nail sticker, a nail tip, and the like on which printing is performed based on the data of the design, rather than with the data of the design itself. According to the embodiment in which the user is provided with a nail sticker and the like on which printing has been performed based on the data of the design, the user can use the information obtaining system even when the user is in an environment where the printing device 3 cannot be used (for example, even when the user does not own the printing device 3 and there is no nail salon nearby where the printing device 3 is installed).

A nail sticker or a nail tip is often cut or shaved from the outer circumference to fit the shape of the user's nail. For this reason, the numeral, shape, and so forth, as "motifs" for identifying the "identifier", are preferably arranged as close to the center as possible.

For example, when the "specific information" includes ticket information (ticket number, seat number, etc.) for a concert or an event, a nail sticker or a nail chip on which a design containing the information of the ticket purchased by the user is printed may be sent to the user instead of a paper ticket. In this case, the user can enter the event venue simply by putting this on his or her nail and going to the event venue.

The use of a printed nail sticker, nail tip, etc. leads to higher durability than printing directly on a nail based on data. Therefore, a printed nail sticker, nail tip, etc. can be used as a safe substitute for a paper ticket and the like.

Although some embodiments of the present disclosure have been described above, the scope of the present disclosure is not limited to the embodiments described above, but includes the scope of the present disclosure stated in claims and its equivalents.

The invention claimed is:

1. An information obtaining method executed by an information provision device, the information obtaining method comprising:

obtaining an image of each printing target with a design including a motif printed, thereby obtaining images of printing targets with respective designs including respective motifs printed;

identifying an identifier based on a combination of the motifs included in the designs printed on the printing targets in the images; and obtaining specific information corresponding to the identifier based on the identifier, wherein a reading order is set for the printing targets, and wherein the identifier is identified by the motifs being combined based on the reading order, wherein the reading order is set based on background colors of the designs printed on the respective printing targets.

2. The information obtaining method according to claim 1, wherein the printing target includes a plurality of printing targets, and wherein at least any one of the motifs is printed on each of the a plurality of printing targets.

3. The information obtaining method according to claim 2, wherein the identifier is identified based on an arrangement of the motifs in the image.

4. The information obtaining method according to claim 1, wherein the identifier is identified based on a motif having a largest size in a print area in the printing target of the motifs in the image.

5. The information obtaining method according to claim 1, wherein the identifier is identified based on an arrangement of the motifs in a printing area in the printing target in the image.

6. The information obtaining method according to claim 1, wherein the identifier is identified by converting each of the motifs to a corresponding number and adding up the number.

7. The information obtaining method according to claim 1, wherein the printing target is a nail of a finger or a toe or a medium to be attached to the nail.

8. An information obtaining device comprising:

a memory that stores a program; and at least one processor that executes the program stored in the memory, wherein the processor obtains an image of each printing target with a design including a motif printed, thereby obtaining images of printing targets with respective designs including respective motifs printed, identifies an identifier based on a combination of the motifs included in the designs printed on the printing targets in the images, and obtains specific information based on the identified identifier and first correspondence data that defines correspondence between the specific information and the identifier, wherein a reading order is set for the printing targets, and wherein the identifier is identified by the motifs being combined based on the reading order, wherein the reading order is set based on background colors of the designs printed on the respective printing targets.

9. A non-transitory computer-readable storage medium storing a program that causes a computer to:

obtain an image of each printing target with a design including a motif printed, thereby obtaining images of printing targets with respective designs including respective motifs printed;

identify an identifier based on a combination of the motifs included in the designs printed on the printing targets in the images; and obtain specific information corresponding to the identifier based on the identifier wherein a reading order is set for the printing targets, and wherein the identifier is identified by the motifs being combined based on the reading order, wherein the reading order is set based on background colors of the designs printed on the respective printing targets.

* * * * *

UNITED STATES PATENT AND TRADEMARK OFFICE
CERTIFICATE OF CORRECTION

| | | |
|---|---|---|
| PATENT NO. | : 12,106,164 B2 | Page 1 of 1 |
| APPLICATION NO. | : 18/125536 | |
| DATED | : October 1, 2024 | |
| INVENTOR(S) | : Kazuko Hayashi | |

It is certified that error appears in the above-identified patent and that said Letters Patent is hereby corrected as shown below:

In the Claims

In Column 23, Claim 2, Line 28, delete "the a" and insert -- the --, therefor.

Signed and Sealed this
Third Day of June, 2025

Coke Morgan Stewart
*Acting Director of the United States Patent and Trademark Office*